(12) United States Patent
Schmitt

(10) Patent No.: US 9,151,194 B2
(45) Date of Patent: Oct. 6, 2015

(54) PROGRESSIVE DISTRIBUTOR BASE BODY FOR CONVEYING LUBRICANT THERETHROUGH

(71) Applicant: Rainer Schmitt, Herxheim (DE)

(72) Inventor: Rainer Schmitt, Herxheim (DE)

(73) Assignee: LINCOLN GMBH, Walldorf (DE)

( * ) Notice: Subject to any disclaimer, the term of this patent is extended or adjusted under 35 U.S.C. 154(b) by 314 days.

(21) Appl. No.: 13/673,488

(22) Filed: Nov. 9, 2012

(65) Prior Publication Data

US 2013/0118835 A1 May 16, 2013

(30) Foreign Application Priority Data

Nov. 11, 2011 (DE) .......................... 10 2011 086 179

(51) Int. Cl.
*F01M 9/00* (2006.01)
*F16N 25/02* (2006.01)
(52) U.S. Cl.
CPC . *F01M 9/00* (2013.01); *F16N 25/02* (2013.01)
(58) Field of Classification Search
CPC ................................ F16N 25/02; F16N 7/385
USPC ............................................. 184/6, 6.14, 7.4
See application file for complete search history.

(56) References Cited

U.S. PATENT DOCUMENTS

| 2,792,911 | A | | 5/1957 | Harter |
| 3,406,790 | A | * | 10/1968 | Gruber .............................. 184/6 |
| 3,921,760 | A | | 11/1975 | Brownrigg |
| 4,044,924 | A | * | 8/1977 | Saretzky ....................... 222/250 |
| 5,311,968 | A | * | 5/1994 | Pingel ............................. 184/6.4 |
| 5,497,852 | A | * | 3/1996 | Little et al. ...................... 184/7.4 |
| 5,799,751 | A | | 9/1998 | Winkler et al. |
| 2010/0206667 | A1 | | 8/2010 | Paluncic et al. |

FOREIGN PATENT DOCUMENTS

| DE | 1600327 B1 | 9/1970 |
| DE | 19607783 A1 | 9/1997 |
| DE | 202009002951 U1 | 4/2009 |
| EP | 0792720 A1 | 9/1997 |

* cited by examiner

*Primary Examiner* — William E Dondero
*Assistant Examiner* — Robert T Reese
(74) *Attorney, Agent, or Firm* — Bryan Peckjian; SKF USA Inc. Patent Dept.

(57) ABSTRACT

A progressive distributor base body for distributing lubricant includes a first lubricant inlet channel, at least one second lubricant inlet channel, at least first and second cylinders each configured to slidably support a piston element, and a bore fluidly connecting at least one of the first and second lubricant inlet channels with a channel that is fluidly connected to the first and second cylinders. The progressive distributor base body is formed as one-piece without any seams and a longitudinal direction of the second lubricant inlet channel is parallel to a longitudinal direction of the bore.

15 Claims, 3 Drawing Sheets

PROGRESSIVE DISTRIBUTOR BASE BODY FOR CONVEYING LUBRICANT THERETHROUGH

CROSS-REFERENCE

This application claims priority to German patent application no. 10 2011 086 179.3 filed on Nov. 11, 2011, the contents of which are fully incorporated herein by reference.

TECHNICAL FIELD

The present invention generally relates to a progressive distributor for use in conveying and distributing lubricant to multiple outlet ports.

BACKGROUND

Progressive distributors are generally known, e.g., from U.S. Pat. No. 3,921,760, DE 20 2009 002 951 U (US 2010/0206667) and DE 196 07 783 A1 (U.S. Pat. No. 5,799,751).

SUMMARY

It is an object of the present teachings to disclose an improved progressive distributor base body, preferably which is producible and operable in an efficient manner.

In one aspect of the present teachings, a progressive distributor includes a base body having at least first and second lubricant inlet channel or ports.

As used herein, the term "progressive distributor" should be understood as meaning a distributor configured to sequentially (i.e. temporally one after another) supply or convey a fixed or adjustable amount of lubricant to a plurality of different lubrication points. Preferably, the energy that the distributor uses to supply the lubricant to multiple outlets or output ports comes exclusively from the kinetic energy, which the lubricant possesses upon entering into the progressive distributor base body.

The term "progressive distributor base body" is intended to mean the base body of a progressive distributor.

The term "lubricant inlet channel" or "lubricant input port" are intended to mean a structural element configured to lead-in (intake) and/or further guide lubricant into and/or through the base body. The (each) lubricant inlet channel or port is preferably formed as a cavity or aperture within the progressive distributor base body and is distinguished from a pipe and a part of a T-shaped connection by pipes.

According to certain aspects of the present teachings, two lubricant inlet channels can be produced in a cost-effective manner, and also enable the progressive distributor base body to be designed in a compact manner. Moreover, in such designs, trouble-shooting operations can be simply performed when a fault occurs. For example, in a lubricant system having a plurality of progressive distributors, each of which includes a progressive distributor base body according to the present teachings, it is not necessary to disconnect individual progressive distributors in order to perform the trouble-shooting operation when a fault occurs. Instead, it is possible trouble-shoot each individual progressive distributor by introducing or supplying lubricant through the second lubricant inlet channel, e.g., by using a manual pump.

Preferably, the first lubricant inlet channel converges, merges or joins with the second lubricant inlet channel, i.e. the first and second lubricant inlet channels are in fluid communication. In this case, the first and second channels can be alternately used depending on the type of operation that will be performed.

The progressive distributor base body is preferably formed as one-piece, i.e. integrally without any seams between its various parts. As used herein, the term "one-piece" should be understood as encompassing products formed, e.g., by casting or injection molding techniques, in which its components or parts are separable only by destroying or permanently damaging the base body. A stable construction can be achieved by such a one-piece embodiment.

A longitudinal direction of the second lubricant inlet channel is preferably parallel, or at least substantially parallel, to a longitudinal direction of a bore of the progressive distributor base body. Further, the bore connects at least one of the first and second lubricant inlet channels with a channel of the progressive distributor base body. This base body channel leads to at least two cavities of the progressive distributor base body that are each configured to accommodate a piston element. A simple and cost-effective manufacturing process can be achieved with such a design.

Furthermore, a progressive distributor having a progressive distributor base body is disclosed, in which an efficient manufacture and operation of the progressive distributor can be achieved.

Preferably, the progressive distributor includes at least one lubricant nipple, through which lubricant is introducible into the second lubricant inlet channel in at least one operational mode of the progressive distributor. A simple and cost-effective operation and, in particular a simple search for faults, can be thereby achieved.

The lubricant nipple is preferably disposed on, at or near one (terminal) end of the second lubricant inlet channel. In this case, a compact construction can be achieved.

In a preferred embodiment of the present teachings, the progressive distributor (or the progressive distributor base body) is free of electronic components that influence or effect the conveyance or supply of the lubricant. That is, the progressive distributor (or the progressive distributor base body) preferably exclusively contains mechanical or mechanically-actuatable parts. A simple and reliable functioning can thereby be achieved.

Preferably, the progressive distributor includes a plurality of lubricant outlets and is configured to convey predetermined amounts of lubricant in a predetermined time interval to the plurality of lubricant outputs for the same influx or inflow of lubricant into the progressive distributor. In this way, an effective lubricant supply can be achieved.

Further objects, embodiments, advantages and designs of the present teachings will be explained in the following, or will become apparent, with the assistance of the exemplary embodiments and the appended Figures.

DETAILED DESCRIPTION OF THE INVENTION

Figure 1:
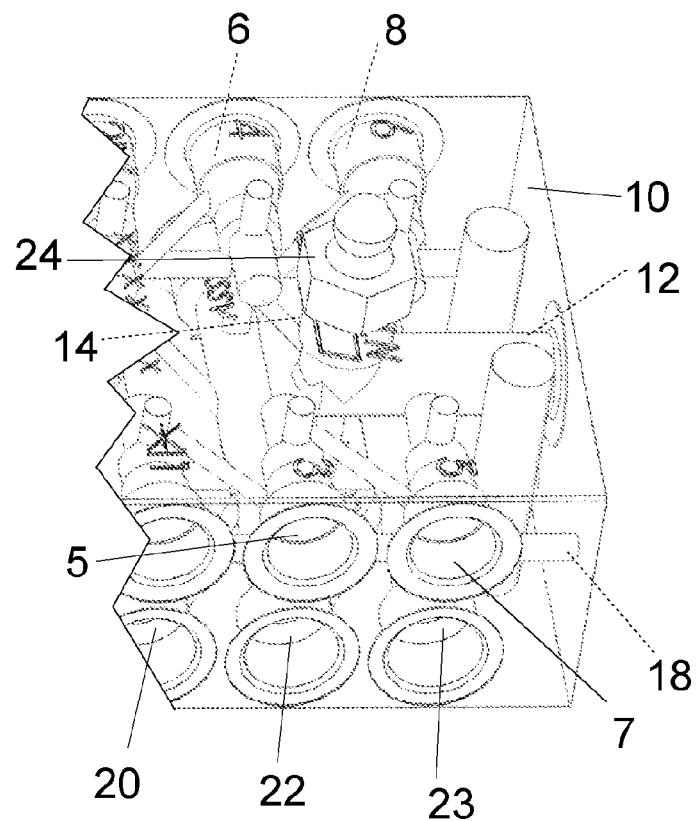
FIG. 1 shows a perspective view of a portion of the progressive distributor having a base body, in which its edges and bore are depicted in a visible manner, but closures or seals for the cavities, in which piston elements are respectively disposed, are not depicted.
Figure 2:
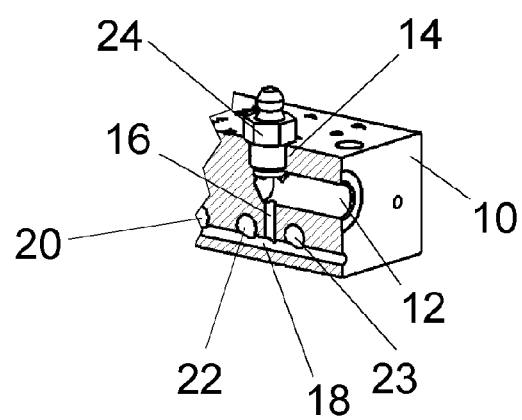
FIG. 2 shows a partial cross-section through the progressive distributor of FIG. 1.

FIG. 1 shows a perspective view of a portion of a progressive distributor base body 10 of the progressive distributor, wherein its edges and bores are depicted in a visible manner. The progressive distributor base body 10 includes first and second lubricant inlet channels 12, 14, which are both formed as bores. The second lubricant inlet channel 14 discharges into the first lubricant inlet channel 12. Further, the progressive distributor base body 10 is formed as one-piece without any seams between its various components and/or parts.

A longitudinal direction of a bore 16 of the progressive distributor base body 10 extends parallel to a longitudinal direction of the second lubricant inlet channel 14 and connects these channels 12, 14 with a channel 18 of the progressive distributor base body 10. The channel 18 is in fluid communication with cavities (cylinders) 20, 22, 23 of the progressive distributor base body 10. Piston elements A, B, C of the progressive distributor are accommodated in the cavities 20, 22 and 23, respectively, as shown in FIGS. 3 to 7. Seals, which close the cavities at their ends, are not illustrated in FIG. 1. Although not shown in FIG. 1, the progressive distributor preferably also includes a fourth piston element D, as shown in FIGS. 3 to 7.

In the alternative, the progressive distributor base body 10 could be modified to include at least two disks, which are affixed to each other. In this case, sealing relative to the area or environment outside of the progressive distributor base body 10 is possible. Further, in this case, channels could transition from one disk into another disk.

In a first operation mode or procedure of the preferred progressive distributor, the lubricant inlet channel 12 is connected to an automatically-functioning pump, which pumps lubricant into the lubricant inlet channel 12 at a constant volume flow. The lubricant is then distributed to the outlet ports 1-8, as will be further described below.

In a second operation mode or procedure of the preferred progressive distributor, lubricant can be introduced into the progressive distributor base body 10 via a lubricant nipple 24 fluidly connected to the lubricant inlet channel 14, e.g., by using a manually-operable pump. The lubricant nipple 24 includes a reset valve and is screwed into the lubricant inlet channel 14. Further, the lubricant nipple 24 can be disposed on, at or near one (terminal) end of the lubricant inlet channel 14.

The progressive distributor is free of electronic components, which influence the conveyance of the lubricant. That is, the lubricant is conveyed or supplied to the outlet ports 1-8 solely by mechanically-acting elements.

In the first operation mode or procedure, the progressive distributor is configured to supply predetermined amounts of lubricant to the lubricant outlets 1-8 in a predetermined time interval, wherein the energy, which is necessary for supplying the lubricant to the outlets 1-8, is derived or supplied exclusively from the energy, which the lubricant possesses as kinetic energy when it enters into the progressive distributor base body 10.

The lubricant can be, e.g., grease or oil.

FIGS. 3 to 7 schematically show a part of the sequence of a cyclical (repeating) operating procedure of the progressive distributor.

Figure 3:
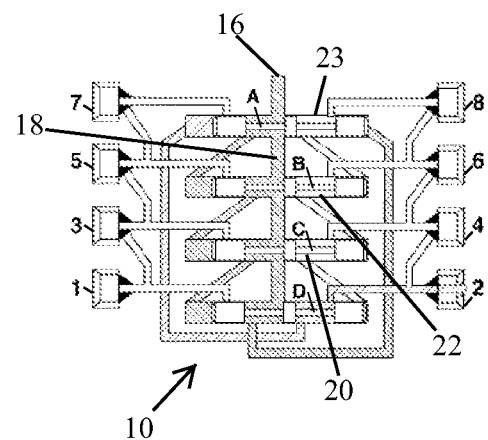
FIGS. 3 to 7 show successive phases of a cyclical operation procedure of the progressive distributor of FIGS. 1 and 2.

Lubricant flows into the base body 10 through the bore 16 and flows up to one (right-side) end of piston element A, as shown in FIG. 3. The pressure of the lubricant causes piston element A to move leftward in its cylinder (23) relative to the progressive distributor base body 10, as will be understood by comparing the respective positions of piston element A in FIGS. 3 and 4.

In FIG. 3, lubricant is shown as being pressed through the lubricant outlet 2 as the final distribution of lubricant from a preceding sequence of lubricant distributions. The lubricant is caused to be pressured through lubricant outlet 2 by movement of piston element D rightward (according to the directions of FIGS. 3-7) due to lubricant pressing against the left-side of piston element D via a connection channel that is fluidly connected to the cylinder slidably supporting piston element C.

Figure 4:
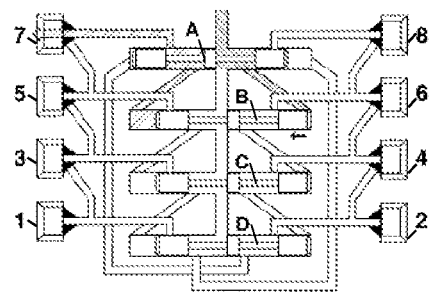

As shown in FIG. 4, the leftward movement of piston element A opens a connection channel to one (right-side) end of piston element B and causes a predetermined amount of lubricant to be conveyed through lubricant outlet 7. Then, the pressure of the lubricant causes piston element B to move leftward relative to the progressive distributor base body 10, as will be understood by comparing the respective positions of piston element B in FIGS. 4 and 5.

Figure 5:
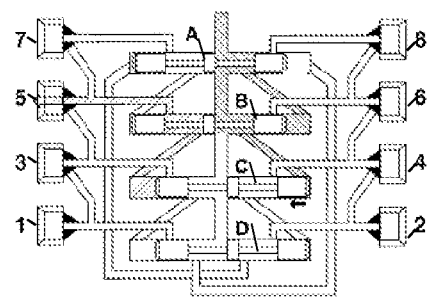

As shown in FIG. 5, the leftward movement of piston element b opens a connection channel to one (right-side) end of piston element c and causes a predetermined amount of lubricant to be conveyed through lubricant outlet 5. Then, the pressure of the lubricant causes piston element C to move leftward relative to the progressive distributor base body 10, as will be understood by comparing the respective positions of piston element C in FIGS. 5 and 6.

Figure 6:
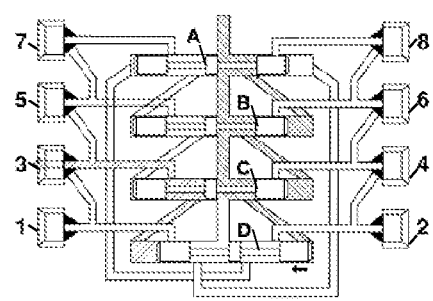

As shown in FIG. 6, the leftward movement of piston element C opens a connection channel to one (right-side) end of piston element D and causes a predetermined amount of lubricant to be conveyed through lubricant outlet 3. Then, the pressure of the lubricant causes piston element D to move leftward relative to the progressive distributor base body 10, as will be understood by comparing the respective positions of piston element B in FIGS. 6 and 7.

Figure 7:
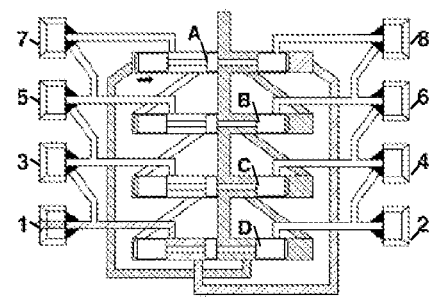

Finally, as shown in FIG. 7, the leftward movement of piston element D opens a connection channel to one (left-side) end of piston element A and causes a predetermined amount of lubricant to be conveyed through lubricant outlet 1. Then, the pressure of the lubricant causes piston element A to move rightward relative to the progressive distributor base body 10.

As a result, one half period of the first operation mode or procedure is concluded. The sequence of the second half of the period then proceeds in an analogous manner, wherein piston elements A-D are successively moved rightward, thereby sequentially outputting lubricant from lubricant outlet ports 8, 6, 4 and 2.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved progressive distributor devices for supplying lubricant and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

A Piston Element
B Piston Element
C Piston Element
D Piston Element
1 Lubricant outlet
2 Lubricant outlet
3 Lubricant outlet
4 Lubricant outlet
5 Lubricant outlet
6 Lubricant outlet
7 Lubricant outlet
8 Lubricant outlet
10 Progressive distributor base body
12 Lubricant inlet channel
14 Lubricant inlet channel
16 Bore
18 Channel
20 Cavity
22 Cavity
23 Cavity
24 Lubricant nipple

The invention claimed is:

1. A progressive distributor base body comprising:
a first lubricant inlet channel in the progressive distributor base body,
a second lubricant inlet channel in the progressive distributor base body, the first lubricant inlet channel and the second lubricant inlet channel being configured such that a lubricant can be introduced into the progressive distributer base body at two separate locations,
at least first and second cylinders each configured to slidably support a piston element, wherein the two separate locations where lubricant can be introduce into the progressive distributer base body are both configured to introduced lubricant with enough pressure to slide the piston elements thereby operating the progressive distributer base body, and
a bore fluidly connecting at least one of the first and second lubricant inlet channels with a channel that is fluidly connected with the first and second cylinders,
wherein the progressive distributor base body is formed as one-piece without any seams, and
a longitudinal direction of the second lubricant inlet channel is parallel to a longitudinal direction of the bore.

2. The progressive distributor base body according to claim 1, wherein the first lubricant inlet channel fluidly converges with the second lubricant inlet channel.

3. A progressive distributor comprising:
the progressive distributor base body according to claim 2,
a first piston slidably supported in the first cylinder, and
a second piston slidably supported in the second cylinder.

4. The progressive distributor according to claim 3, further comprising:
at least one lubricant nipple configured to introduce lubricant into the second lubricant inlet channel during at least one operational mode of the progressive distributor.

5. The progressive distributor according to claim 4, wherein the lubricant nipple is disposed at one terminal end of the second lubricant inlet channel.

6. The progressive distributor according to claim 5, wherein the progressive distributor is configured such that lubricant is conveyed solely by kinetic energy without requiring electronic components to aid lubricant flow.

7. The progressive distributor according to claim 6, further including:
at least first and second lubricant outlets fluidly connected to the first and second cylinders, respectively,
wherein the progressive distributor is configured such that, for the same influx of lubricant into the progressive distributor, predetermined amounts of lubricant are conveyed in a predetermined time interval to the first and second lubricant outlets.

8. The progressive distributor according to claim 7, wherein the first and second cylinders each have first and second lubricant outlet ports that are spatially separated along a longitudinal direction of the respective cylinder.

9. The progressive distributor according to claim 8, further comprising first and second connection channels configured to fluidly couple the first cylinder to the second cylinder.

10. The progressive distributor according to claim 9, wherein the first and second connection channels are arranged such that the first connection channel fluidly couples the first and second cylinders when the first piston is disposed in a first longitudinal position within the first cylinder and the second connection channel fluidly couples the first and second cylinders when the first piston is disposed in a second longitudinal position within the first cylinder, the first longitudinal position being spaced from the second longitudinal position in the longitudinal direction of the first cylinder.

11. The progressive distributor according to claim 10, wherein the first piston and the first and the first and second lubricant outlets of the first cylinder are arranged such that movement of the first piston in a first direction in the longitudinal direction of the first cylinder causes a first predetermined amount of lubricant to be output from the first lubricant outlet and movement of the first piston in a second direction in the longitudinal direction of the first cylinder causes a second predetermined amount of lubricant to be output from the second lubricant outlet, the second direction being opposite of the first direction.

12. A method of providing a lubrication system, comprising the steps of:
providing a plurality of progressive distributors, each comprising a progressive distributor base body comprising:
a first lubricant inlet channel,
a second lubricant inlet channel such that a lubricant can be introduced into the progressive distributor base body at two separate locations,
at least first and second cylinders each configured to slidably support a piston element, wherein the two separate locations where lubricant can be introduced into the progressive distributer base body are both configured to introduce lubricant with enough pressure to slide the piston elements thereby operating the progressive distributer base body, and
a bore fluidly connecting at least one of the first and second lubricant inlet channels with a channel that is fluidly connected with the first and second cylinders,
wherein the progressive distributor base body is formed as one-piece without any seams, and
a longitudinal direction of the second lubricant inlet channel is parallel to a longitudinal direction of the bore; and interconnecting and configuring the plurality of progressive distributors such that a common source of lubricant can be used to provide lubricant to the first lubricant inlet channel of each of the plurality of progressive distributor base bodies, wherein the second lubricant inlet channel of each of the plurality of progressive distributor base bodies is configured such that the associated one of the plurality of progressive distributor based bodies can receive additional lubricant to test for proper functionality while all of the plurality of progressive distributors are primed with an amount of lubricant sufficient for normal operation without needing to disconnect the associated one of the plurality of progressive distributors from the rest of the plurality of progressive distributors.

13. The method of claim 12, further comprising providing lubricant from the common source so that all of the plurality of progressive distributors are primed with an amount of lubricant sufficient for normal operations.

14. The method of claim 13, further comprising testing one of the plurality of progressive distributors by introducing lubricant into the one progressive distributer base bodies second lubricant inlet channel while the common source is not operating such that a momentum of the lubricant carries lubricant into the bore and operating the one progressive distributor base body.

15. The method of claim 12, wherein the step of providing a plurality of progressive distributors further comprises each of the plurality of progressive distributor base bodies having the first lubricant inlet channel oriented perpendicularly with respect to the second lubrication inlet channel and the bore.

\* \* \* \* \*